(12) United States Patent
Sarri et al.

(10) Patent No.: US 7,690,891 B2
(45) Date of Patent: Apr. 6, 2010

(54) RESTING ELEMENT FOR A COMPRESSOR OR TURBINE

(75) Inventors: Franco Sarri, Florence (IT); Rossano Vitellozzi, Pistoia (IT); Simone Lippi, Lucca (IT)

(73) Assignee: Nuovo Pignone S.p.A., Florence (IT)

( * ) Notice: Subject to any disclaimer, the term of this patent is extended or adjusted under 35 U.S.C. 154(b) by 631 days.

(21) Appl. No.: 11/611,968

(22) Filed: Dec. 18, 2006

(65) Prior Publication Data

US 2007/0160470 A1    Jul. 12, 2007

(30) Foreign Application Priority Data

Dec. 28, 2005    (IT)    .................. MI2005A2506

(51) Int. Cl.
*F01D 25/28*    (2006.01)
(52) U.S. Cl. .................. 415/213.1; 415/232
(58) Field of Classification Search .............. 415/213.1, 415/214.1, 215.1, 232; 294/1.1, 82.1; 248/116, 248/127, 133, 188.3, 188.8, 351, 371, 469, 248/554, 658, 659, 674, 676, 677, 688
See application file for complete search history.

(56) References Cited

U.S. PATENT DOCUMENTS

| | | | | |
|---|---|---|---|---|
| 1,584,944 | A | * 5/1926 | Johnson | .................... 415/213.1 |
| 6,460,822 | B1 | * 10/2002 | Lee | ............................. 248/635 |
| 7,114,922 | B2 | * 10/2006 | Tomko et al. | ............ 415/214.1 |

FOREIGN PATENT DOCUMENTS

WO    WO 8804366 A1 *  6/1988

* cited by examiner

*Primary Examiner*—Edward Look
*Assistant Examiner*—Ryan H Ellis
(74) *Attorney, Agent, or Firm*—Potomac Patent Group PLLC

(57)    ABSTRACT

Resting element (10) for a compressor or turbine comprising a first cantilever resting portion (20) and a second fixing portion (30) to a case of the compressor or turbine by means of a series of screws (60), the second fixing portion (30) comprises a third end portion (32) externally axial symmetrical and also a fourth counter-portion (36) situated between the third portion (32) and the first resting portion (20) to prevent the disengagement of a hauling rope.

33 Claims, 2 Drawing Sheets

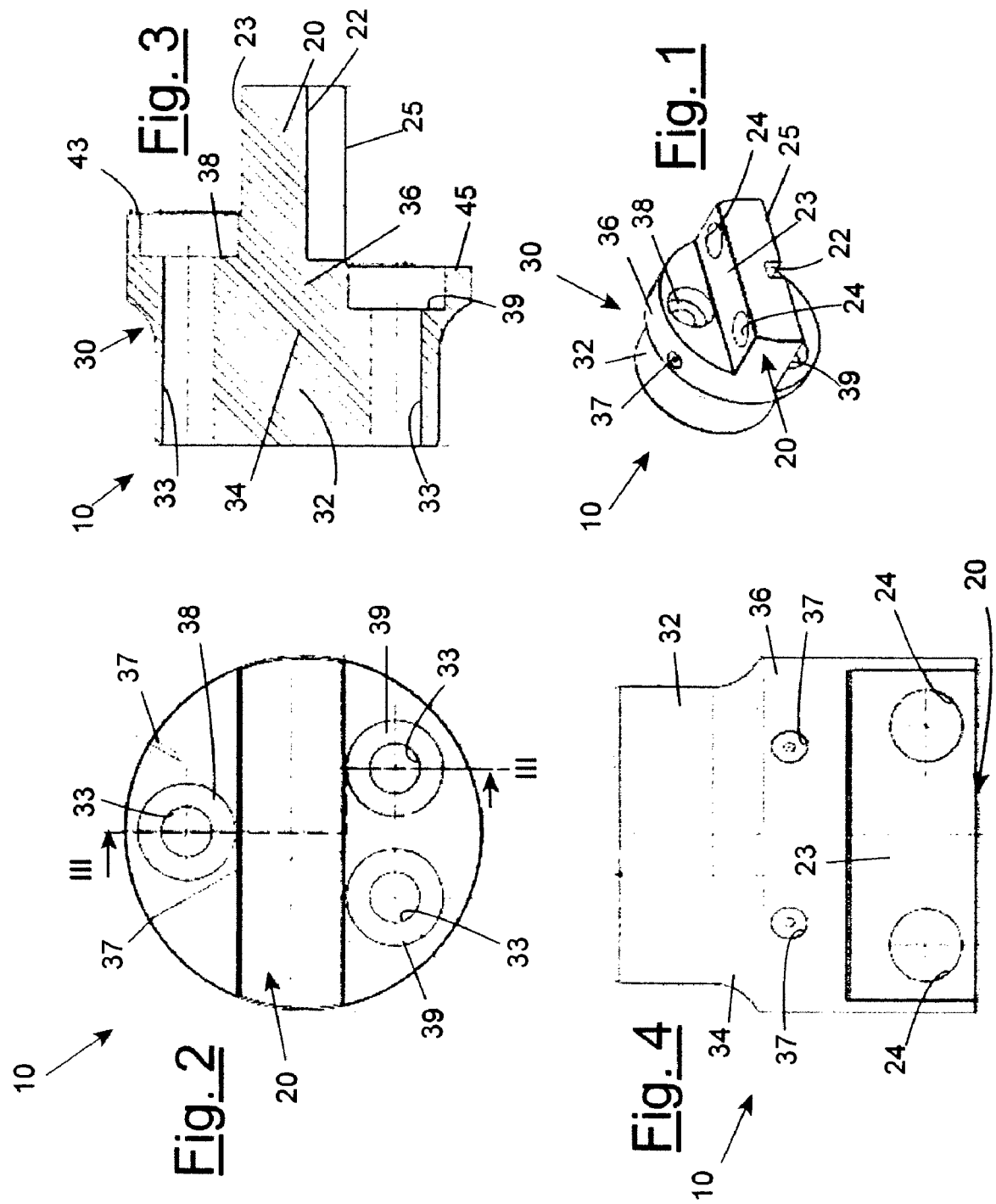

RESTING ELEMENT FOR A COMPRESSOR OR TURBINE

BACKGROUND

1 Field of the Invention

The present invention relates to a resting element for a compressor or turbine predisposed for being externally fixed to the case of the compressor or turbine by means of a series of screws.

2 Description of the Background

A resting element for a compressor or turbine, commonly called "rest foot", has a substantially "L"-shaped conformation, with a first fixing portion to the case and a cantilever resting portion, which is laid against a base or pedestal constrained thereto.

In particular the resting element has edges as each portion is substantially in the form of a parallelepiped.

A first drawback is that it is not possible to move the compressor or turbine by means of a bridge crane or even by ropes unless with further gripping elements, which are also fixed by means of screws inserted in corresponding threaded holes situated in the case of the compressor or turbine, with an increase in production times and costs.

BRIEF SUMMARY OF THE EMBODIMENTS

An objective of the present invention is to provide a resting element for a compressor or turbine which can be used either as a resting element or as a lifting and moving element of the compressor or turbine.

A further objective is to provide a resting element for a compressor or turbine which avoids the necessity of gripping elements fixed to the case of the compressor or turbine for lifting or moving the compressor or turbine itself and which at the same time avoids the necessity of providing threaded holes for their fixing.

Another objective is to provide a resting element for a compressor or turbine which allows a better stress distribution with the same number of screws used for the external fixing to the case of the compressor or turbine.

Yet another objective is to have a resting element for a compressor or turbine which allows a reduction in the production times and costs of the compressor or turbine.

These objectives according to the present invention are achieved by providing a resting element for a compressor or turbine as specified in claim 1.

Further characteristics of the invention are indicated in the subsequent claims.

DESCRIPTION OF THE DRAWINGS

The characteristics and advantages of a resting element for a compressor or turbine according to the present invention will appear more evident from the following illustrative and non-limiting description, referring to the enclosed schematic drawings, in which:

FIG. 1 is a raised left-side perspective view from above of a preferred embodiment of a resting element for a compressor or turbine according to the present invention;

FIG. 2 is a raised front view of the resting element of FIG. 1;

FIG. 3 is a raised side cross-section view according to the line III-III of the resting element of FIG. 2;

FIG. 4 is a view from above of the resting element of FIG. 1;

DESCRIPTION OF THE EMBODIMENTS

Figure 5:
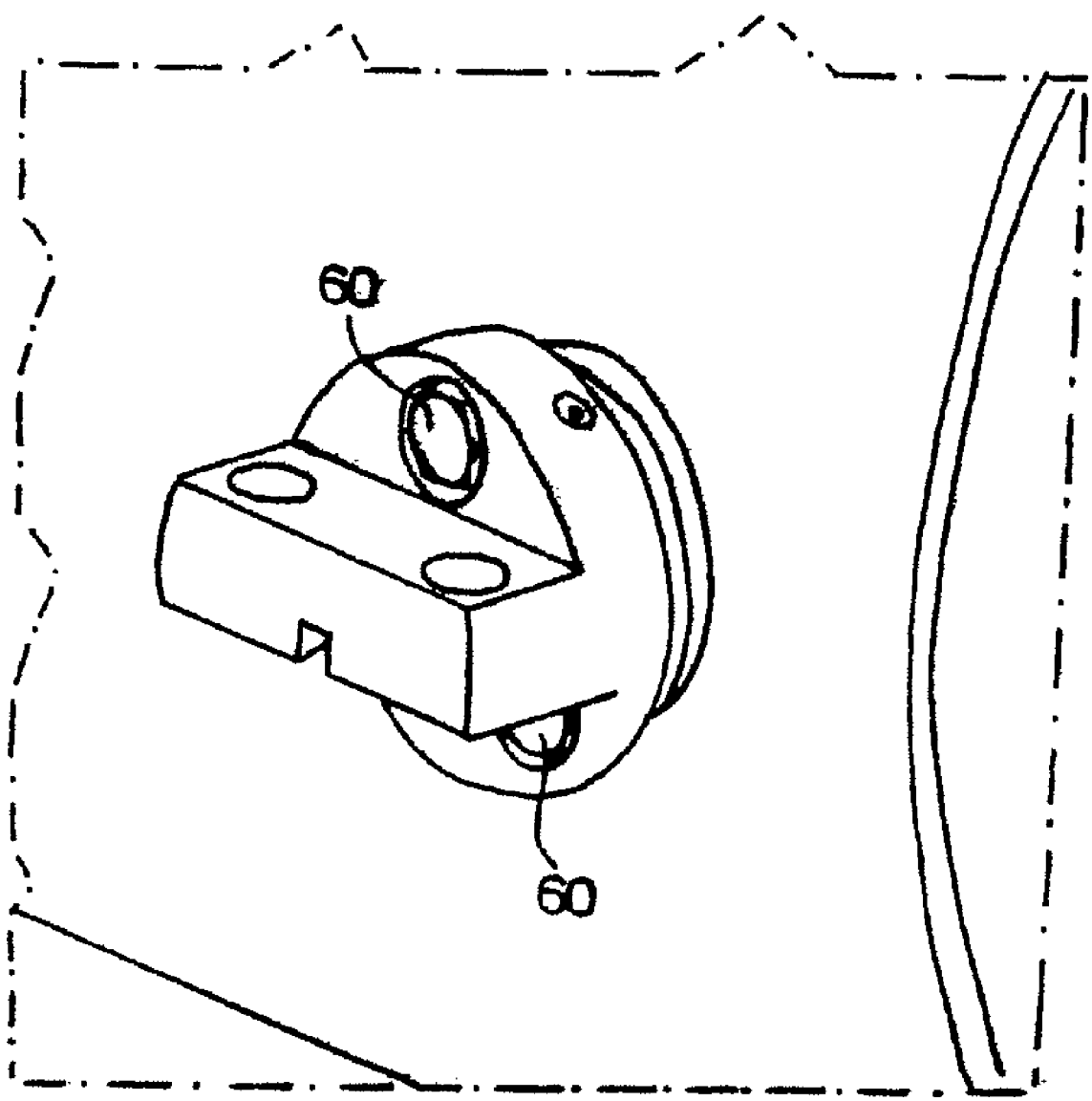
FIG. 5 is a raised left-side perspective view from above of the element of FIG. 1 fixed by means of screws to a case of a compressor.

With reference to the figures, these show a resting element 10 for a compressor or turbine comprising a first cantilever resting portion 20 and a second fixing portion 30 to a case of the compressor or turbine by means of a series of screws 60.

The second fixing portion 30 comprises a third end portion 32 externally axial symmetrical and also a fourth counter-portion 36 situated between the third portion 32 and the first resting portion 20 to prevent the disengagement of a hauling rope.

In this way, it is possible to both correctly rest and also lift and move the turbine or compressor by means of a bridge crane or similar moving system, in particular with the help of hauling ropes which are suitable for being engaged with said third portion 32 avoiding the possibility of disengagement with said third portion itself thanks to said fourth counter-portion 36.

In other words, said resting element 10 is capable of also exerting the function of a possible gripping element, advantageously avoiding both the necessity thereof and also the production time and cost of the threaded holes for fixing it to the case of the compressor or turbine.

Said third end portion 32 is preferably a cylindrical portion which has a substantially lower diameter with respect to said fourth counter-portion 36 and is also coaxial therewith.

This prevents the disengagement of the hauling ropes during the moving of the compressor or turbine.

In particular, according to a preferred embodiment, the third end portion 32 is connected to the fourth counter-portion 36 by means of a connecting portion 34, in order to have a better stress distribution.

Said first cantilever resting portion 20 is preferably substantially orthogonal to said fourth counter-portion 36, i.e. it substantially extends in an orthogonal direction starting from a base end of the fourth counter-portion 36 to which it is connected.

Said first cantilever resting portion 20 is preferably basically arranged centrally with respect to said base end of said fourth portion 36 to which it is connected so as to define a first base surface 43 and a second base surface 45.

Said first cantilever portion 20 in turn has a first base surface 23 and a second base surface 25 opposite the first, said second base surface 25 is suitable for being coupled with a pedestal for supporting said compressor or turbine.

The second base surface 45 of said fourth portion 36 is preferably withdrawn with respect to the first base surface 43, as shown in FIG. 3, to allow a better stress distribution and increase the resting surface area 25 with the pedestal.

Said first base surface 23 of said first resting portion 20 is preferably adjacent to said first base surface 43 of said fourth portion 36 and is also substantially orthogonal to it, said second base surface 25 of said first resting portion 20 is adjacent to said second base surface 45 of said fourth portion 36 and is also substantially orthogonal thereto.

Said first resting portion 20 preferably comprises a groove 22 suitable for being engaged with a supporting pedestal situated on said second base surface 25 of said first resting portion 20.

Said first resting portion 20 preferably comprises two pass-through holes 24 situated on said first base surface 23 which completely pass through said first portion 20 as far as said second base surface 25 for the insertion of elements suitable for constraining said resting element 10 to a pedestal, not shown.

Said fourth counter-portion 36 preferably comprises a series of moving holes 37 for the insertion of corresponding lifting elements for a correct positioning and fixing of said resting element 10 to said compressor or turbine.

In particular, said second base surface 45 of said fourth counter-portion 36 is in a withdrawn position with respect to said first base surface 43 of said fourth counter-portion 36.

At least one axial pass-through hole 33 in particular equipped with a corresponding seat 38 for the insertion of a corresponding screw 60, is preferably situated on said first base surface 43 of said fourth counter-portion 36.

In particular, said seat 38 is obtained starting from said base surface 43 of said fourth counter-portion 36.

At least two axial pass-through holes 33 in particular equipped with a corresponding seats 39 for the insertion of a corresponding screw 60, are preferably situated on said second base surface 45 of said fourth counter-portion 36.

In particular, said seats 39 are obtained starting from said base surface 45 of said fourth counter-portion 36 and are preferably in a withdrawn position with respect to said seat 38 so as to allow a better stress distribution and a correct dimensioning of the base coupling surface 25 with the supporting pedestal.

In this way, it is advantageously possible to reduce the stress on said resting element 10 as there are at least two screws 60 which oppose the flexing moment generated by the reaction force to the weight force of the compressor or turbine which is generated on the second base surface 25 of said first resting portion 20.

This advantageously increases the useful life and reliability of the resting element and consequently of the compressor or turbine, and also allows the dimension/number of coupling screws 60 to be reduced.

It can thus be seen that a resting element 10 for a compressor or turbine according to the present invention achieves the objectives indicated above.

The resting element for a compressor or turbine of the present invention thus conceived can undergo numerous modifications and variants, all included in the same inventive concept.

Furthermore, in practice the materials used, as also the dimensions and components can vary, according to technical demands.

What is claimed is:

1. A resting element for a compressor or turbine, comprising:
   a first cantilever resting portion including,
      a first base surface,
      a second base surface opposite to the first base surface, said second base surface is configured for being coupled with a pedestal for supporting said compressor or turbine, and
      a groove configured for being engaged with a supporting pedestal situated on said second base surface; and
   a second fixing portion configured to be attached to a case of said compressor or turbine by a series of screws wherein said second fixing portion comprises a third end portion externally axial symmetrical and a fourth counter-portion situated between said third portion and said first cantilever resting portion to prevent a disengagement of a hauling rope.

2. The resting element according to claim 1, wherein said third end portion is an externally cylindrical portion which has a smaller diameter with respect to said fourth counter-portion and is also coaxial thereto.

3. The resting element according to claim 1, wherein said third end portion is connected to said fourth counter-portion by a connecting portion.

4. The resting element according to claim 1, wherein said first cantilever resting portion substantially extends in an orthogonal direction starting from a base end of the fourth counter-portion to which it is connected.

5. The resting element according to claim 1, wherein said first cantilever resting portion is substantially arranged in a central position with respect to an end of said fourth portion to which it is connected so as to define a first base surface and a second base surface.

6. The resting element according to claim 5, wherein said second base surface of said fourth counter-portion is in a withdrawn position with respect to said first base surface of said fourth counter-portion.

7. The resting element according to claim 5, wherein at least one axial pass-through hole is situated on said first base surface of said fourth counter-portion.

8. The resting element according to claim 5, wherein at least two axial pass-through holes are situated on said second base surface of said fourth counter-portion.

9. The resting element according to claim 1, wherein said first base surface of said first resting portion is adjacent to said first base surface of said fourth counter-portion and is also substantially orthogonal thereto, said second base surface of said first resting portion is adjacent to said second base surface of said fourth portion and is also substantially orthogonal thereto.

10. The resting element according to claim 1, wherein said first resting portion comprises two pass-through holes situated on said first base surface, which completely pass through said first portion, as far as said second base surface.

11. The resting element according to claim 1, wherein said fourth counter-portion comprises a series of moving holes for the insertion of corresponding lifting elements for a correct positioning and fixing of said resting element to said compressor or turbine.

12. A resting element for a compressor or turbine, comprising:
    a first cantilever resting portion; and
    a second fixing portion configured to be attached to a case of said compressor or turbine by a series of screws, said second fixing portion including,
       a third end portion externally axial symmetrical, and
       a fourth counter-portion situated between said third portion and said first cantilever resting portion to prevent a disengagement of a hauling rope, said fourth counter-portion including a series of moving holes for insertion of corresponding lifting elements for a correct positioning and fixing of said resting element to said compressor or turbine.

13. The resting element according to claim 12, where said third end portion is an externally cylindrical portion which has a smaller diameter with respect to said fourth counter-portion and is also coaxial thereto.

14. The resting element according to claim 12, wherein said third end portion is connected to said fourth counter-portion by a connecting portion.

15. The resting element according to claim 12, wherein said first cantilever resting portion is substantially arranged in a central position with respect to an end of said fourth portion to which it is connected so as to define a first base surface and a second base surface.

16. The resting element according to claim 15, wherein said second base surface of said fourth counter-portion is in a withdrawn position with respect to said first base surface of said fourth counter-portion.

17. The resting element according to claim 15, wherein at least one axial pass-through hole is situated on said first base surface of said fourth counter-portion.

18. The resting element according to claim 15, wherein at least two axial pass-through holes are situated on said second base surface of said fourth counter-portion.

19. The resting element according to claim 12, wherein said first cantilever portion has a first base surface and a second base surface opposite to the first base surface, said second base surface configured to being coupled with a pedestal for supporting said compressor or turbine.

20. The resting element according to claim 19, wherein said first base surface of said first resting portion is adjacent to said first base surface of said fourth counter-portion and is also substantially orthogonal thereto, said second base surface of said first resting portion being adjacent to said second base surface of said fourth portion and also being substantially orthogonal thereto.

21. The resting element according to claim 19, wherein said first resting portion comprises a groove suitable for being engaged with a supporting pedestal situated on said second base surface.

22. The resting element according to claim 19, wherein said first resting portion comprises two pass-through holes situated on said first base surface, which completely pass through said first portion, as far as said second base surface.

23. A resting element for a compressor or turbine, comprising:
 a first cantilever resting portion; and
 a second fixing portion configured to be attached to a case of said compressor or turbine by a series of screws, said second fixing portion including,
  a third end portion externally axial symmetrical, and
  a fourth counter-portion situated between said third portion and said first cantilever resting portion to prevent a disengagement of a hauling rope,
 wherein said first cantilever resting portion is substantially arranged in a central position with respect to an end of said fourth counter-portion to which it is connected so as to define a first base surface and a second base surface, and said second base surface of said fourth counter-portion is in a withdrawn position with respect to said first base surface of said fourth counter-portion.

24. The resting element according to claim 23, wherein said third end portion is an externally cylindrical portion which has a smaller diameter with respect to said fourth counter-portion and is also coaxial thereto.

25. The resting element according to claim 23, wherein said third end portion is connected to said fourth counter-portion by a connecting portion.

26. The resting element according to claim 23, wherein said first cantilever resting portion substantially extends in an orthogonal direction starting from a base end of the fourth counter-portion to which it is connected.

27. The resting element according to claim 23, wherein said first cantilever portion has a first base surface and a second base surface opposite to the first base surface, said second base surface is suitable for being coupled with a pedestal for supporting said compressor or turbine.

28. The resting element according to claim 27, wherein said first base surface of said first resting portion is adjacent to said first base surface of said fourth counter-portion and is also substantially orthogonal thereto, said second base surface of said first resting portion is adjacent to said second base surface of said fourth portion and is also substantially orthogonal thereto.

29. The resting element according to claim 27, wherein said first resting portion comprises a groove configured for being engaged with a supporting pedestal situated on said second base surface.

30. The resting element according to claim 27, wherein said first resting portion comprises two pass-through holes situated on said first base surface, which completely pass through said first portion, as far as said second base surface.

31. The resting element according to claim 23, wherein said fourth counter-portion comprises a series of moving holes for the insertion of corresponding lifting elements for a correct positioning and fixing of said resting element to said compressor or turbine.

32. The resting element according to claim 23, wherein at least one axial pass-through hole is situated on said first base surface of said fourth counter-portion.

33. The resting element according to claim 23, wherein at least two axial pass-through holes are situated on said second base surface of said fourth counter-portion.

* * * * *